United States Patent Office 3,471,281
Patented Oct. 7, 1969

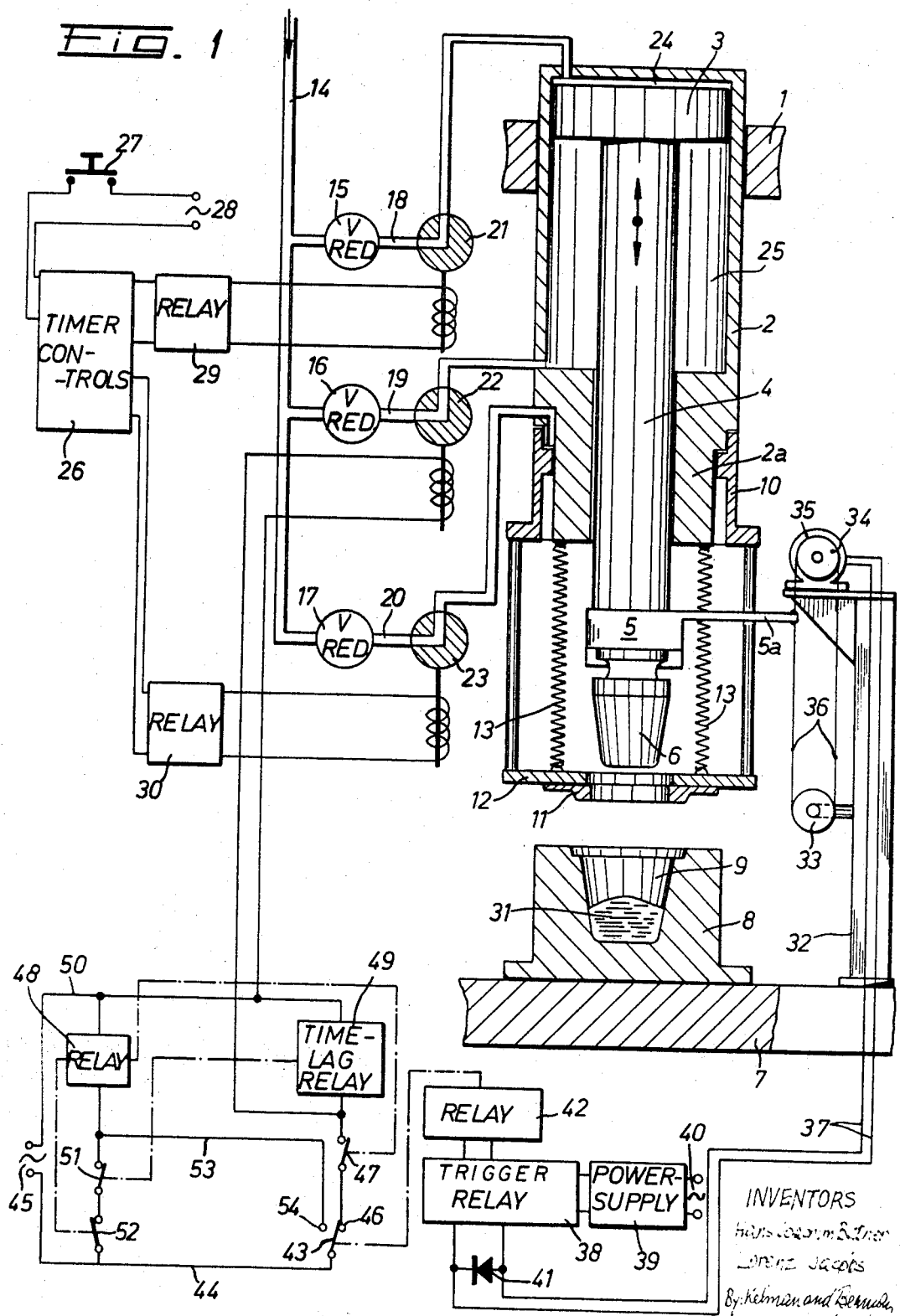

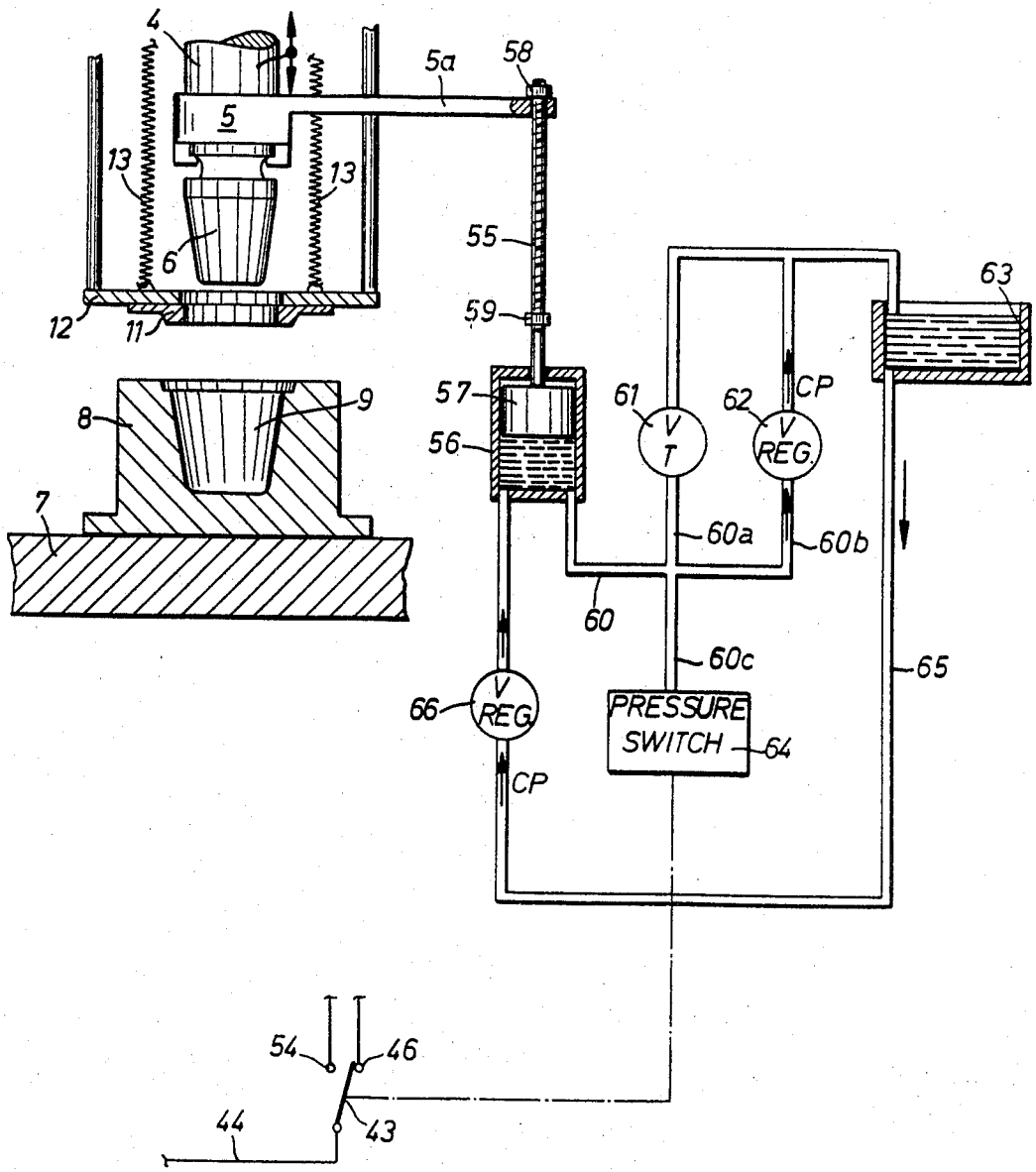

3,471,281
GLASS PRESSING MACHINE WITH FLUID PRESSURE CONTROLS
Hans Joachim Bittner and Lorenz Jacobs, Hagen, Westphalia, Germany, assignors to H. Putsch & Comp., Hagen-in-Westfalen, Germany
Continuation-in-part of application Ser. No. 322,011, Nov. 5, 1963, which is a continuation-in-part of application Ser. No. 14,409, Mar. 11, 1960. This application Aug. 22, 1967, Ser. No. 672,947
(Filed under Rule 47(a) and 35 U.S.C. 116)
Int. Cl. C03b 11/16; G12b 1/00, 3/00
U.S. Cl. 65—163  3 Claims

ABSTRACT OF THE DISCLOSURE

An improved control mechanism for the glass pressing machine of U.S. Patent No. 3,337,325 in which a body of glass in the mold is relieved of the weight of the molding plunger by a pressure fluid in the motor of the machine which balances the weight of the plunger. The control mechanism produces an electrical or hydraulic signal in response to a sensed decrease in plunger velocity occurring as the plunger enters the liquid glass in the mold, and the valve admitting the balancing fluid to the motor is controlled directly or indirectly by the signal.

Cross reference to related applications

This application is a continuation-in-part of our copending application, Ser. No. 322,011, filed on Nov. 5, 1963 (U.S. Patent No. 3,337,325), which in turn is a continuation-in-part of our application, Ser. No. 14,409, filed on Mar. 11, 1960, and now abandoned.

Background of the invention

This invention relates to glass pressing machines, and particularly to an improvement in the glass pressing machine disclosed in our afore-mentioned application, Ser. No. 322,011.

In that application, we disclosed an arrangement in which the glass, while solidifying in the mold, is relieved of the weight of the plunger by pressure fluid admitted to the press motor under a pressure just sufficient to balance the weight of the plunger. Glass moldings produced in the manner of our earlier application are free of internal stresses which are an unavoidable cause of defects if the weight of the plunger and of connected elements of the machine rests on the body of glass in the mold during the solidification period.

The earlier apparatus relied upon a timing mechanism for controlling the admission of balancing fluid to the press motor, and such a mechanism is entirely satisfactory if the amount of liquid glass fed to the mold is precisely controlled. It is difficult, however, to meter glass into molds with great accuracy, and the full success of our earlier process depends on adequate metering equipment and on the skill of an operator.

Because of the slightly tapering shape of the plunger which is normally necessary for release of the plunger from the molded glass body, relatively small changes in the amount of glass confined in the mold cause relatively wide changes in the thickness of the molded glass bottom, and concomitant changes in the thickness of side walls. The thickness of the bottom and of the walls affects the cooling and solidification rate of the glass, and the viscosity of molten glass varies sharply with even slight temperature differences. It is evident, therefore, that close control of the molding process is not possible with timing controls if the amount of glass in the mold cannot be precisely controlled. The timing device may balance the weight of the plunger too soon or too late. Premature release of the molding pressure by balancing fluid causes deformation of the still very fluid glass. Belated weight release cannot prevent the formation of internal stresses in the molded object.

The object of the invention is the provision of an improved control mechanism capable of automatically providing pressure fluid to balance the plunger weight during the very short interval between completion of the molding step and prior to solidification of the glass to the point where internal stresses may be developed by the weight of the plunger, and equally successful with amounts of glass greater or smaller than the exact amount for which the mold was designed.

Summary of the invention

We have found that a suitable signal for admission of balancing fluid to the press motor can be derived from the movement of the plunger during the molding stroke. The velocity of plunger movement decreases as the plunger enters the molten glass in the mold. When the space between the plunger and the covered mold is completely filled with glass, the plunger comes to a halt. Pressure on the glass should be released at this moment or shortly thereafter.

We therefore provide our glass pressing machine with a sensing device which senses the velocity of the plunger during the movement of the plunger inward of the mold while the plunger velocity is being reduced by the resistance of the glass body in the mold. A signal generating device is operatively connected to the sensing device and to the valve which admits the balancing pressure fluid to the press motor in such a manner as to generate a signal when the sensed decreasing velocity reaches a predetermined value, usually close to zero. The valve arrangement which controls the balancing pressure fluid operates in response to the signal.

Typically, the signal may be an electrical signal or a pressure signal. In the latter case, the signal generating device may include a cylinder or similar container, a throttled conduit communicating with the container, a liquid in the container and the conduit, and a piston or its equivalent arranged for movement inward of the container for raising the liquid pressure in the same and in the conduit. The sensing means may simply consist of a motion transmitting linkage connecting the piston to the press plunger for joint movement.

An electrical signal may be produced by an electrical generator which is operated by the afore-mentioned motion transmitting linkage. A signal transmitting chain including one or more electrically operated relays may be interposed between the generator and the valve which actually admits the balancing pressure fluid, and may itself be electrically operated.

A very convenient motion transmitting linkage for the purpose of our invention includes a cable, rope or similar pliable member trained over a pulley and fastened to the plunger in such a manner that the pulley is turned when the plunger moves inward of the mold. The reduction in the rotary speed of the pulley may be translated into an electrical signal by coupling the pulley to a generator, such as an electric tachometer, the reduction of plunger velocity being indicated by the declining output of the generator.

Other features, additional objects, and many of the attendant advantages of this invention will be readily appreciated as the same becomes better understood by reference to the following detailed description when considered in connection with the accompanying drawing.

Brief description of the drawing

In the drawing:

FIG. 1 shows a glass pressing machine equipped with the control mechanism of the invention partly in elevational section, and partly in a conventional manner; and FIG. 2 shows a portion of a modification of the machine of FIG. 1 in an analogous manner.

Description of the preferred embodiments

Referring now to the drawing in detail, and initially to FIG. 1, there is shown a glass pressing machine of the basic type described in our afore-mentioned applications, but equipped with a novel control mechanism for balancing the weight of the press plunger.

The frame 1 of the machine, only partly shown, fixedly supports the cylinder 2 of a pneumatic press motor in which a piston 3 is received for vertical movement, as indicated by a double arrow. The piston carries a rod 4 which projects downward from the tubular bottom end 2a of the cylinder 2. Annular seals, not illustrated, are interposed between the piston 3 and the cylinder 2, and between the piston rod 4 and the bottom end 2a in a conventional manner. An adapter 5 at the lower end of the piston rod 4 carries an approximately frustoconical plunger 6.

A base plate 7 of the frame 1 supports a mold 8 whose cavity 9 flares upward toward its open top in alignment with the axis of the pneumatic motor 2, 3. A sleeve 10 is axially slidable on the cylinder end 2a in such a manner that an annular chamber between the sleeve and the cylinder end expands and contracts. An annular mold cover 11 is mounted on the sleeve 10 by means of a frame 12. Helical tension springs 13 bias the frame 12 and the sleeve 10 toward the illustrated position in which the volume of the aforementioned annular chamber is at a minimum.

A manifold 14 is connected to a non-illustrated compressor, and serves as a source of air for three conduits 18, 19, 20 which are respectively provided with adjustable reducing valves 15, 16, 17 and with solenoid operated two-way valves 21, 22, 23. In the illustrated positions, the valves 21, 22, 23 respectively connect the manifold 14 with a top compartment 24 of the cylinder 2, with a bottom compartment 25 of the cylinder, and with the annular chamber between the cylinder end 2a and the sleeve 10. In their non-illustrated other positions, the solenoid valves vent the compartment 24, 25 and the chamber.

The valves 21, 23 are operated by conventional, electrically driven, timer controls 26 including a timing switch connected to the solenoids of the valves through relays 29, 30. The motor of the timing switch is started by a push button switch 27 interposed between the controls 26 and an A.C. line 28, the controls including a conventional holding circuit connected to the line 28 in a non-illustrated manner to maintain operation of the timer motor after release of the push button switch 27.

The structure described so far finds its equivalent in our application, Ser. No. 322,011 and operates in an analogous manner. When the valves 21, 23 connect the pneumatic motor to the manifold 14 while the compartment 25 is being vented by the valve 22, the piston 3 and the frame 12 move downward on the cylinder 2. The plunger 6 is driven under pneumatic pressure into a body 31 of molten glass in the mold cavity 9 while the mold opening about the plunger is closed by the cover 11 to prevent overflowing of the glass 31. When the molded glass has sufficiently solidified, the compartment 24 is vented by the valve 21 while the compartment 25 is connected to the manifold, the plunger 6 is withdrawn from the mold 8, and the cover 11 is retracted by the springs 13 when the valve 23 is shifted from the illustrated position. The valves 21, 23 are operated in proper sequence by the timer controls 26.

The weight of the plunger 6 and of associated elements of the motor 2, 3 is balanced during solidification of the molded glass by admission of compressed air into the compartment 25 while the plunger 6 is in its lowermost position, and the valves 21, 23 admit air to the compartment 24 and to the annular chamber between the sleeve 10 and the cylinder end 2a, the reducing valves 15, 16, 17 being set for the necessary relationship between the several air pressures.

This invention is more specifically concerned with the control of the solenoid valve 22 which admits the pressure fluid necessary for balancing the weight of the plunger and of associated elements.

A bracket 32 on the base plate 7 supports two pulleys 33, 34 and an electric tachometer 35 whose rotor is fastened to the pulley 34. A cable 36 is trained in a closed loop over the pulleys, and an arm 5a mounted on the adapter 5 is attached to the cable 36 in such a manner as to turn the pulleys clockwise, as viewed in FIG. 1, when the plunger 6 moves upward, and to turn the pulleys counter-clockwise while the plunger moves inward of the mold cavity 9. The output voltage of the tachometer 35, which is proportional to the rotary speed of the pulley 34, is applied by conductors 37 to a trigger relay 38 in the output circuit of a D.C. power supply 39 connected to an A.C. line 40. A rectifier element 41 is arranged between the conductors 37 to prevent operation of the relay 38 by the direct current output of the tachometer 35 during upward movement of the plunger 6.

The trigger relay 38 generates a current signal as long as the output voltage of the tachometer 35 exceeds a value which may be set on the relay in a conventional manner, not shown, and operates a single-pole, double throw power relay 42 by the signal.

The relay 42, in cooperation with a double-pole, single-throw relay 48 and a single-pole, single-throw time lag relay 49, energizes and deenergizes the solenoid winding of the valve 22. The movable contact 43 of the relay 42 is permanently connected by a conductor 44 with one pole of an A.C. line 45. The other pole of the line is permanently connected by a conductor 50 to the return poles of the relays 48, 49 and of the solenoid in the valve 22. One fixed contact 46 of the relay 42 is connected through one switch 47 of the relay 48 with the time lag relay 49 and the valve 22. The second fixed contact 54 of the relay 42 is connected by a conductor 53 with the relay 48 and with a series circuit consisting of the switch 51 of the relay 49 and a holding switch 52 of the relay 48. When the switches 51, 52 are closed, they connect the conductor 53 and the relay 48 to the conductor 44, and thereby the first-mentioned pole of the line 45.

The afore-described apparatus operates as follows:

When the push-button switch 27 is briefly closed, the timer controls 26 sequentially energize the solenoids of the valves 21, 23 to move the valves into the illustrated position. The resulting downward movement of the plunger 6 from the position shown in FIG. 1 is relatively rapid, and the output voltage of the tachometer 35 is sufficient to energize the relay 42, whereby the contact 43 engages the contact 54, and the relay 48 is caused to close its normally open switches 47, 52. The compartment 25 is vented by the valve 22.

As the plunger 6 penetrates into the molten glass 31 in the mold cavity 9, the increasing resistance of the glass causes a corresponding decrease in the velocity of the plunger and in the output voltage of the tachometer. The plunger is ultimately stopped when the glass fills the confined space between the mold 8, the plunger 6, and the cover 11. As the output voltage of the tachometer approaches zero, the relay 42 is deenergized, and its movable contact is shifted from the fixed contact 54 to the fixed contact 46. The time lag relay 49 and the solenoid of the valve 22 are thereby energized, the switch 47 remaining closed as the relay 48 is being supplied with current by the switches 51, 52. The compressed air admitted to the compartment 25 by the valve 22 balances the weight of the plunger 6 and of associated pneumatic motor elements, whereby the molded glass in the confined space of the mold 8 is relieved of pressure while it solidifies.

The relay 29 is deenergized by the timer controls 26 after a time sufficient to make the molded glass body self-supporting, and the top compartment 24 in the cylinder 2 is vented by the valve 21 which is turned from the illustrated position by a returned spring, not shown, as is conventional. The relay 30 is simultaneously deenergized and causes the cover 11 to be lifted from the mold 8 by the springs 13. The piston 3 moves upward toward the illustrated position under the air pressure in the compartment 25. The resulting output of the tachometer 35 is short-circuited by the rectifier element 41, and the relay 42 is not energized.

The relay 49 releases its armature after a delay sufficient to permit return of the press motor to its starting position. When the switch 51 is thereby opened, the relay 48 is deenergized, and the switch 47 is opened to interrupt the current supply to the valve 22. The mold 8 with the molded glass body contained therein may now be replaced by a mold containing molten glass, and a new molding cycle may be started as described above.

FIG. 2 shows a portion of a glass pressing machine identical with that illustrated in FIG. 1 except for the mechanism which senses the velocity of the descending plunger 6.

The free end of the arm 5a on the adapter 5 has an opening in which a partly threaded rod 55 is slidably received. The axis of the rod is parallel to the direction of movement of the plunger 6 during normal operation of the machine. The lower end of the rod 55 enters a hydraulic cylinder 56 and is attached therein to a piston 57 which moves hydraulic fluid into and out of the lower compartment in the cylinder 56 when actuated by the rod 55. The rod is equipped with two nuts 58, 59 which abuttingly engage the arm 5a when the plunger 6 approaches its upper and lower terminal positions, the spacing of the nuts 58, 59 being set substantially smaller than the stroke of the piston 57 in the cylinder 56, and the combined length of the piston stroke and of the nut spacing being approximately equal to the stroke of the plunger 6.

The liquid-filled lower compartment of the cylinder 56 communicates with a manifold pipe 60. Branches 60a, 60b of the pipe 60 are respectively equipped with a precisely adjustable throttle valve 61 and with an adjustable pressure release valve 62 which opens a path of much greater flow section than that of the valve 61 when the pressure in the manifold pipe 60 exceeds a value adjusted on the valve 62. Both branches 60a, 60b lead to an open storage tank 63 for the hydraulic fluid.

A third branch 60c of the pipe 60 is connected with a single-pole, double-throw pressure switch 64 equipped with a movable contact 43 and two fixed contacts 46, 54. These contacts are identical with the contacts of the relay 42 in FIG. 1 and are arranged in circuit with a double-pole, single-throw relay and with a single-pole, single-throw time relay identical with the elements 48, 49 as described with reference to FIG. 1, only the conductor 44 of the connecting circuit being shown in FIG. 2.

A suction line 65 connects the tank 63 to the liquid filled compartment of the cylinder 56 and is provided with a check valve 66.

The apparatus of FIG. 2 operates as follows:

When the plunger 6 approaches its terminal position during the molding stroke, the arm 5a engages the abutment nut 59 on the rod 55, and the piston 57 moves with the plunger 6, thereby driving hydraulic fluid into the pipe 60 and initially raising the pressure in the pipe to a value sufficient to open the valve 62 for discharge of liquid into the tank 63. This value is selected so that the pressure switch 64 is actuated to move the contact 43 from the illustrated position into engagement with the fixed contact 54.

As the velocity of the plunger 6 is reduced by the resistance of the molten glass in the mold cavity 9, hydraulic fluid is discharged from the pipe 60 through the throttle valve 61 only, the valve 62 remaining closed, and the pressure in the pipe 60 ultimately drops below the value necessary for actuating the switch 64. The movable contact 43 is returned to the illustrated position when the velocity of the plunger 6 approaches zero. The exact moment of switch operation may be adjusted by setting the throttle valve 61. The switch may be operated prior to full stoppage of the plunger or somewhat after plunger stoppage because of delayed pressure release through a very narrow opening in the valve 61.

As long as the contact 43 is held in engagement with the fixed contact 54 by pressure in the pipe 60, the valve 22 of the glass pressing machine, not seen in FIG. 2, holds the compartment 25 open in a manner evident from the preceding description of the relay system of FIG. 1. The weight of the plunger 6 and of associated press elements is balanced by air pressure in the compartment 25, when the plunger comes to a halt until the compartment 24 is vented by the timer controls 26, whereupon the plunger travels upward.

During the terminal stage of the upward movement, the arm 5a abuttingly engages the nut 58, and the piston 57 is moved upward in the cylinder 56 until the position of the apparatus shown in FIG. 2 is restored. Liquid is thereby drawn into the cylinder 56 through the suction line 65 and the check valve 66.

The relay 38 and the valves associated with the pressure switch 64 are preferably set in such a manner that an electric or hydraulic signal for the opening of the valve 22 is generated slightly before the plunger 6 actually stops. The weight of the plunger and of the pneumatic motor elements which are fixedly connected with the plunger is not balanced at once when the valve 22 is opened, and a small but significant time is required for building up the necessary pressure in the compartment 25. The settings necessary for balancing the plunger 6 at the moment at which it stops may be determined by trial and error. It is normally safe to balance the plunger weight shortly after the plunger stops, but before the glass solidifies sufficiently to permit internal stresses to be caused by the plunger weight. It is not advisable to balance the plunger pressure before the plunger has actually come to a halt. A relatively high percentage of deformed moldings may be produced under such conditions.

What is claimed is:

1. In a glass pressing machine having a mold (9), a plunger (6) arranged for movement inward of said mold in a downward direction for shaping a body (31) of glass in said mold, the weight of said plunger tending to move the plunger inward of said mold, and the resistance of said body tending to reduce the speed of movement of the plunger into the mold, a fluid operated motor (2, 3) connected to said plunger for moving the same inward and outward of said mold, a source (14) of operating fluid for said motor, valve means (21–23) interposed between said source and said motor for controlling fluid flow therebetween and for venting said motor, said valve means including a balancing valve arrangement (16, 22) operable for balancing the weight of the plunger by means of fluid admitted to said motor, and control means for operating said balancing valve arrangement when the plunger approaches the bottom of said mold during the shaping of said body of glass, the improvement in the control means which comprises:

(a) voltage generating means (35) movable for generating an output voltage proportional to the rate of movement of said generating means;

(b) motion transmitting means (5, 5a, 36, 34) operatively connecting said voltage generating means to said plunger (6) for movement therewith; and (c) valve operating means (38–54) responsive to said output voltage and operatively interposed between said voltage generating means and said balancing valve arrangement for operating said balancing valve arrangement when the speed of said plunger is reduced by the resistance of said body of glass during movement of the plunger inward of the mold, and said output voltage is concurrently reduced to a set value.

2. In a machine as set forth in claim 1, said voltage generating means including an electric tachometer having a rotor, said motion transmitting means rotating said rotor when said plunger moves inward of said mold.

3. In a machine as set forth in claim 2, said motion transmitting means including a pulley connected to said rotor for joint rotation, and a pliable elongated member, respective portions of said pliable member being trained over said pulley and fastened to said plunger.

References Cited

UNITED STATES PATENTS

| | | | |
|---|---|---|---|
| 561,056 | 5/1896 | Kuhlewind | 65—159 |
| 1,995,653 | 3/1935 | Rowe | 65—159 |
| 2,011,980 | 8/1935 | Miller | 65—314 |
| 2,146,482 | 2/1939 | Miller | 65—159 |
| 2,192,302 | 5/1940 | Errett | 65—159 |
| 2,805,447 | 9/1957 | Voges. | |
| 3,268,319 | 8/1966 | Kawecka et al. | 65—160 |
| 3,337,325 | 8/1967 | Bittner et al. | 65—314 |

S. LEON BASHORE, Primary Examiner

F. W. MIGA, Assistant Examiner

U.S. Cl. X.R.

65—160, 306, 318, 322